US009280724B2

(12) United States Patent
Kang et al.

(10) Patent No.: US 9,280,724 B2
(45) Date of Patent: Mar. 8, 2016

(54) POSE CLASSIFICATION APPARATUS AND METHOD

(71) Applicant: SAMSUNG ELECTRONICS CO., LTD., Suwon-si (KR)

(72) Inventors: Ji-hong Kang, Seoul (KR); Hee-seob Ryu, Hwaseong-si (KR); Mikiyas Teshome, Suwon-si (KR); Seung-kwon Park, Yongin-si (KR); Dong-ho Lee, Seoul (KR); Ki-jun Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 14/104,524

(22) Filed: Dec. 12, 2013

(65) Prior Publication Data

US 2014/0205187 A1 Jul. 24, 2014

(30) Foreign Application Priority Data

Jan. 18, 2013 (KR) ........................ 10-2013-0006101

(51) Int. Cl.
*G06K 9/00* (2006.01)
*G06K 9/62* (2006.01)
*H04N 5/253* (2006.01)
*H04N 5/225* (2006.01)

(52) U.S. Cl.
CPC .......... *G06K 9/6292* (2013.01); *G06K 9/00362* (2013.01)

(58) Field of Classification Search
CPC ...................................................... G06K 9/00
USPC ......... 382/159, 165, 170, 181, 115, 116, 117, 382/118, 236; 348/92, 169, 170, 171, 172, 348/352
See application file for complete search history.

(56) References Cited

U.S. PATENT DOCUMENTS

| 6,959,109 B2 * | 10/2005 | Moustafa ....................... 382/159 |
| 7,702,596 B2 * | 4/2010 | Tu .......................... G06K 9/6256 382/155 |
| 7,783,082 B2 * | 8/2010 | Koshizen ........... G06K 9/00221 382/115 |
| 2010/0278384 A1 | 11/2010 | Shotton et al. |
| 2012/0087575 A1 | 4/2012 | Winn et al. |

FOREIGN PATENT DOCUMENTS

| JP | 2000-137818 A | 5/2000 |
| KR | 10-2006-0074410 A | 7/2006 |

OTHER PUBLICATIONS

Shotton, et al.; "Real-Time Human Pose Recognition in Parts from Single Depth Images"; IEEE Computer Vision and Pattern Recognition (CVPR); 2011; 8 pgs.

* cited by examiner

*Primary Examiner* — Abolfazl Tabatabai
(74) *Attorney, Agent, or Firm* — Sughrue Mion, PLLC

(57) ABSTRACT

A pose classification apparatus is provided. The apparatus includes a first image analyzer and a second image analyzer configured to estimate a body part for each pixel of an input image including a human body, a body part decider configured to calculate reliabilities of analysis results of the first image analyzer and the second image analyzer, and configured to decide the body part for each pixel of the input image based on the calculated reliabilities, and a pose estimator configured to estimate a pose of the human body included in the input image, based on the decided body part for each pixel.

15 Claims, 5 Drawing Sheets

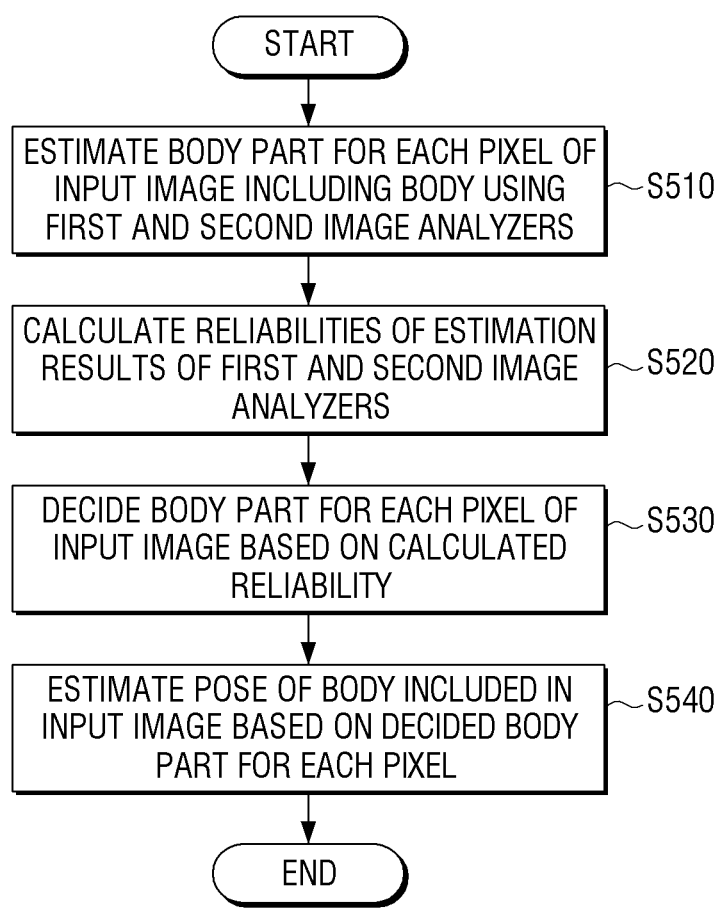

POSE CLASSIFICATION APPARATUS AND METHOD

CROSS-REFERENCE TO RELATED APPLICATIONS

This application claims priority from Korean Patent Application No. 10-2013-0006101, filed on Jan. 18, 2013, in the Korean Intellectual Property Office, the disclosure of which is incorporated herein by reference, in its entirety.

BACKGROUND

1. Field

Apparatuses and methods consistent with the present disclosure relate to a method and apparatus for pose classification. More particularly, exemplary embodiments relate to a pose classification apparatus capable of recognizing the user's gesture or pose and a pose classification method thereof.

2. Description of the Related Art

Technologies of performing a predetermined function or controlling a device by recognizing the user's gestures or poses using a 2-dimensional or 3-dimensional camera have been developed and have been generally applied to electronic devices such as mobile phones, computers, televisions, and game consoles.

The technology of recognizing a user's gestures or poses generally uses a learning algorithm based on diverse data. In such an algorithm, a gesture or a pose which is not included in the data for learning may not be recognized or may remarkably decrease the recognition rate.

Accordingly, in order to increase the performance of recognizing diverse gestures and poses, as many gestures and poses as possible have to be included in the data for learning. However, to do so is costly and time consuming, and it is realistically impossible to reflect all the diverse changes in body parts and poses.

When a high recognition rate of a particular gesture or pose is required, the recognition rate may be enhanced by adding data regarding the required pose to an already learned algorithm and perform relearning. However, in this case, relearning is not only costly and time consuming; but also, the recognition rate increase effect of the added pose is not great.

Therefore, a need exists for a method for reducing time and costs and securing the recognition rate of a particular gesture or pose when a high recognition rate of the particular gesture or pose is required.

SUMMARY

Exemplary embodiments overcome the above disadvantages and other disadvantages not described above. Also, the present disclosure is not required to overcome the disadvantages described above, and an exemplary embodiment may not overcome any of the problems described above.

The present disclosure relates to a pose classification apparatus capable of saving time and costs and enhancing the recognition rate when learning new data, in order to enhance the recognition rate of a particular pose, and a pose classification method thereof.

According to an aspect of the exemplary embodiments, a pose classification apparatus includes a first image analyzer and a second image analyzer configured to estimate for each pixel of an input image including a human body a body part, a body part decider configured to calculate reliabilities of analysis results of the first image analyzer and the second image analyzer, and configured to decide the body part for each pixel of the input image based on the calculated reliabilities, and a pose estimator configured to estimate a pose of the human body included in the input image based on the decided body part for each pixel. The first image analyzer and the second image analyzer learn based on different data.

The second image analyzer may be a random forest classifier which learns at least a portion of poses based on a relatively larger amount of data than the first image analyzer, and which has a higher recognition rate of at least the portion of poses than the first image analyzer.

The body part decider may be configured to compare the calculated reliabilities of the analysis results of the first image analyzer and the second image analyzer, and may determine the body part for each pixel according to the analysis result having higher reliability.

When all of the reliabilities of the analysis results of the first image analyzer and the second image analyzer are equal to or higher than a predetermined value, the body part decider may decide the body part for each pixel according to an average value of the analysis results of the first image analyzer and the second image analyzer.

When the calculated reliability of the analysis result of the second image analyzer is equal to or high than a predetermined value, the body part decider may be configured to decide the body part for each pixel according to the analysis result of the second image analyzer, and when the calculated reliability of the analysis result of the second image analyzer is lower than the predetermined value, the body part decider may be configured to decide the body part for each pixel according to the analysis result of the first image analyzer.

The first image analyzer and the second image analyzer each may include a plurality of body part estimators, each of which is configured to estimate a probability that each of the pixels of the input image belongs to a particular body part, and the first image analyzer and the second image analyzer may each be configured to calculate an average value of the estimation results of the plurality of body part estimators, and may use the average value as the result of the analysis.

The probability may be calculated using an equation below.

$$\text{Reliability} = a * (\text{an average value of the pixels in the analysis result of the image analyzer}) + (1-a) * (\text{a rate of pixels having a probability which is equal to or higher than a predetermined value}).$$

Herein, $0 \le a \le 1$, and "a" is a real number.

According to another aspect of the exemplary embodiments, a method of pose classification includes estimating a body part for each pixel of an input image, including a human body, using a first image analyzer and a second image analyzer, calculating reliabilities of the analysis results of the first image analyzer and the second image analyzer, deciding the body part for each pixel of the input image based on the calculated reliabilities, and estimating a pose of the human body included in the input image, based on the decided body part for each pixel.

The first image analyzer and the second image analyzer may learn based on different data.

The second image analyzer may be a random forest classifier which learns at least a portion of poses based on a relatively larger amount of data than the first image analyzer and which has a higher recognition rate of at least the portion of poses than the first image analyzer.

In the deciding of the body part, the calculated reliabilities of the analysis results of the first image analyzer and the second image analyzer may be compared, and the body part for each pixel may be decided, according to the analysis result having higher reliability.

In the deciding of the body part, in response to all of the reliabilities of the analysis results of the first image analyzer and the second image analyzer being equal to or higher than a predetermined value, the body part for each pixel may be decided according to an average value of the analysis results of the first image analyzer and the second image analyzer.

In the deciding of the body part, in response to the calculated reliability of the analysis result of the second image analyzer being equal to or high than a predetermined value, the body part for each pixel may be decided according to the analysis result of the second image analyzer, and in response to the calculated reliability of the analysis result of the second image analyzer being lower than the predetermined value, the body part for each pixel may be decided according to the analysis result of the first image analyzer.

The estimating of the body part may include estimating a probability that each of the pixels of the input image belongs to a particular body part, using a plurality of body part estimators of each of the first image analyzer and the second image analyzer, and calculating an average value of the estimation results of the plurality of body part estimators of each of the first image analyzer and the second image analyzer.

The probability may be calculated using an equation below.

Reliability=$a$*(an average value of the pixels in the analysis result of the image analyzer)+$(1-a)$*(a rate of pixels having a probability which is equal to or higher than a predetermined value).

Herein, $0 \leq a \leq 1$, and "a" is a real number.

According to the diverse exemplary embodiments, when new data is learned to enhance the recognition rate of a particular pose, time and cost may be saved and the recognition rate may be improved.

An exemplary embodiment may provide a pose classification apparatus including: first and second image analyzers configured to estimate a body part for each pixel of an input image including a human body; a body part decider configured to calculate reliabilities of the analysis results, and configured to decide the body part for each pixel; and a pose estimator configured to estimate a pose of the human body based on the decided body part for each pixel, wherein each of the image analyzers learn based on different data.

Each image analyzers may produce different results based on the same input image and the body part decider may decide the body parts based on the calculated reliabilities.

In response to the calculated reliability of the analysis result of the second image analyzer being equal to or higher than a predetermined value, the body part decider may decide the body part for each pixel according to the analysis result of the second image analyzer.

In response to the calculated reliability of the analysis result of the second image analyzer being lower than the predetermined value, the body part decider may decide the body part for each pixel according to the analysis result of the first image analyzer.

Additional and/or other aspects and advantages of the exemplary embodiments will be set forth, in part, in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by describing certain exemplary embodiments with reference to the accompanying drawings, in which:

FIG. 5 is a flow chart illustrating a pose classification method according to an exemplary embodiment.

DETAILED DESCRIPTION OF THE EXEMPLARY EMBODIMENTS

Figure 1:
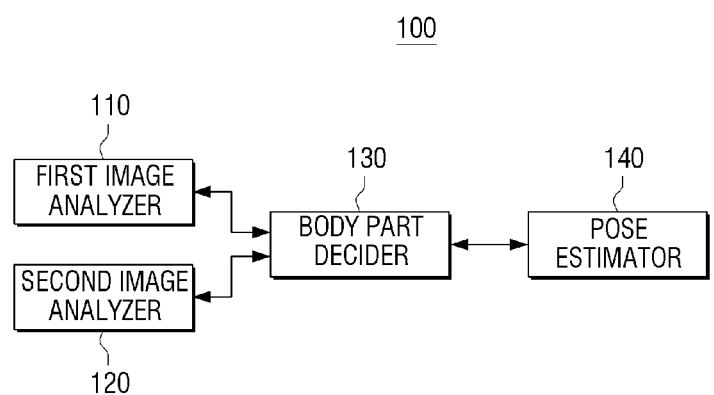
FIG. 1 is a block diagram of a configuration of a pose classification apparatus according to an exemplary embodiment.

Certain exemplary embodiments will now be described in greater detail, with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the invention with unnecessary detail.

FIG. 1 is a block diagram of a configuration of a pose classification apparatus according to an exemplary embodiment. With reference to FIG. 1, the pose classification apparatus 100 may include a first image analyzer 110, a second image analyzer 120, a body part decider 130, and a pose estimator 140. The pose classification apparatus 100 may be embedded in electronic devices such as smart phones, televisions, notebook computers, and table personal computers (PCs), or may be provided as a separate device which is connected to an electronic device.

The first image analyzer 110 and the second image analyzer 120 estimate a body part for each pixel of an input image including a body. The input image may be a 2-dimensional (2D) image or a 3-dimensional (3D) image. When the input image is a 2D image, red (R), green (G), and blue (B) values for each pixel included in the 2D image may be input to the first image analyzer 110. When the input image is a 3D image, a distance value for each pixel included in the 3D image may be input to the first image analyzer 110.

The second image analyzer 120 has learned at least a portion of poses based on a relatively larger amount of data than the first image analyzer 110, and thus has a higher recognition rate of at least a portion of the poses. In other words, the first image analyzer 110 and the second image analyzer 120 perform the same operation in that they estimate a body part for each pixel of the input image, but are distinct in that they perform learning based on different data. Accordingly, the first image analyzer 110 and the second image analyzer 120 may output different results from the same input image.

The first image analyzer 110 and the second image analyzer 120 may be random forest classifiers which have learned based on different data. FIG. 1 shows that the pose classification apparatus 100 includes only the two image analyzers, but the pose classification apparatus 100 may include two or more image analyzers according to an exemplary embodiment.

The first image analyzer 110 is described in greater detail with reference to FIG. 2. Description of the first image analyzer 110 may be applied to the second image analyzer 120 in the same manner, except for the difference that they learn from different data, which has been described above.

Figure 2:
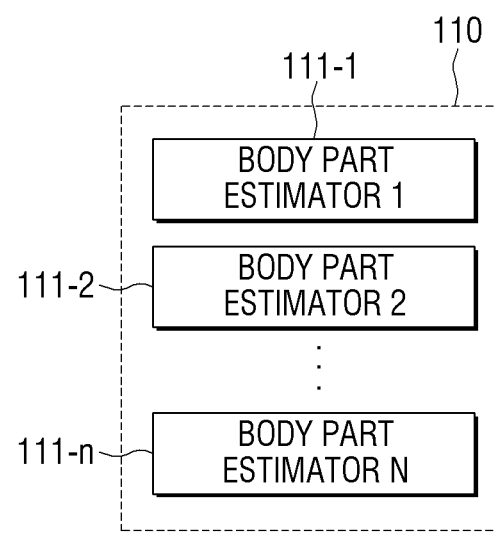
FIG. 2 is a block diagram of a detailed configuration of a first image analyzer according to an exemplary embodiment.

FIG. 2 is a block diagram of a detailed configuration of the first image analyzer 110 according to an exemplary embodiment. With reference to FIG. 2, the first image analyzer 110 may include a plurality of body part estimators 111-1, 111-2, . . . , 111-N. Each body part estimator estimates the probability that each pixel of an input image belongs to a particular body part. The first image analyzer 110 calculates an average value of the estimation results of the plurality of body part estimators, and uses the average value as an analysis result. More detailed operation is described with reference to FIG. 3.

Figure 3:
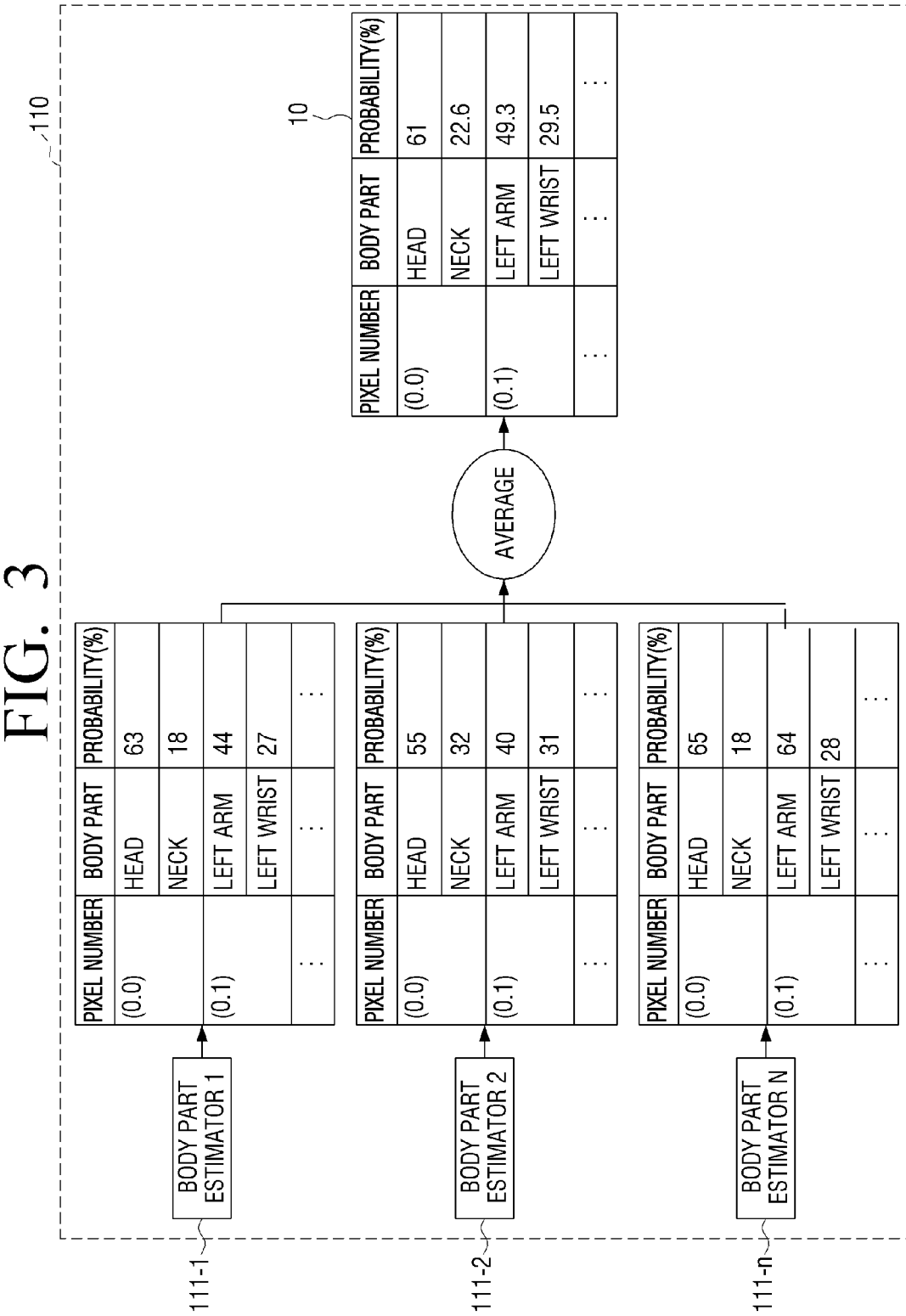
FIG. 3 illustrates detailed operation of the first image analyzer.

FIG. 3 illustrates a detailed operation of the first image analyzer 110. With reference to FIG. 3, each of the body part estimators 111-1, 111-2, . . . , 111-N in the first image analyzer 110 estimates the probability that each pixel belongs to a particular body part. When determining that there is a probability that a pixel belongs to a plurality of body parts, each body part estimator may estimate the probabilities that the pixel belongs to each of the plurality of body parts. For example, the body part estimator 1 (111-1) in FIG. 3 may estimate a 63% probability that pixel (0,0) belongs to a head, and a 18% probability that pixel (0,0) belongs to a neck. In addition, the body part estimator 1 (111-1) may estimate a 44% probability that pixel (0,1) belongs to a left arm, and a 27% probability that pixel (0,1) belongs to a left wrist. In the same manner, the remaining body part estimators 111-2, 111-N may estimate the probabilities that each pixel belongs to particular body parts.

The first image analyzer 110 may calculate average values of the estimation results of the body part estimators 111-1, 111-2, . . . , 111-N, and may use the calculated average value as an analysis result. For example, in FIG. 3, a 61% probability that pixel (0,0) belongs to a head, and a 22.6% probability that pixel (0,0) belongs to a neck may be calculated as average values of the estimation results of the body part estimators 111-1, 111-2, . . . , 111-N with respect to pixel (0,0). In addition, with respect to pixel (0,1), a 49.3% probability that pixel (0,1) belongs to a left arm, and a 29.5% probability that pixel (0,1) belongs to a left wrist may be calculated as result values.

As described above, since the second image analyzer 120 is the same as the first image analyzer 110, except that the second image analyzer 120 and the first image analyzer 110 have learned based on different data, the second image analyzer 120 may calculate average values of the estimation results as result values in the same manner.

The body part decider 130 calculates reliabilities of the analysis results of the first image analyzer 110 and the second image analyzer 120, and decides a body part for each pixel of the input image based on the calculated reliabilities. The reliability of the analysis result of each image analyzer may be calculated using Equation 1 below.

Reliability=$a$*(an average value of the pixels in the analysis result of the image analyzer)+$(1-a)$*(a rate of pixels having a probability which is equal to or higher than a predetermined value)   [Equation 1]

"an average value of the pixels in the analysis result of the image analyzer" indicates an average value of all of the pixels which are analyzed by the image analyzer.

More specifically, when the probability that each pixel belongs to a body part is output as a result value as shown in FIG. 3, "an average value of the pixels in the analysis result of the image analyzer" is an average value of the probability of each pixel. For example, when an image having a resolution of 800*600 is input, "an average value of the pixels in the analysis result of the image analyzer" may be an average value of a total of 480000 pixels.

In addition, "a rate of pixels having a probability which is equal to or higher than a predetermined value" indicates the rate of pixels having a probability which is equal to or higher than the predetermined value (e.g., 50%) from among all of the pixels analyzed by the image analyzer. For example, when the predetermined value is set to 50% and when there are 200000 pixels having a 50% or more probability that each pixel belongs to a particular body part from among the pixels included in an image having a resolution of 800*600, "a rate of pixels having a probability which is equal to or higher than a predetermined value" may be 41.67%.

Herein, when two or more result values are output for each pixel, the highest probability may be used to calculate the reliability. For example, with respect to pixel (0,0) in FIG. 3, since a 61% probability that the pixel belongs to a head is the highest, 61% may be used to calculate the reliability, and with respect to pixel (0,1), since a 49.3% probability that the pixel belongs to a left arm is the highest, 49.3% may be used to calculate the reliability.

In Equation 1, $0 \leq a \leq 1$, and "a" is a real number. "a" is a value that a designer or the user may set or change, and is a variable to determine which one is given a weighting between "an average value of the pixels in the analysis result of the image analyzer" and "a rate of pixels having a probability which is equal to or higher than a predetermined value." When "a" is higher than 0.5, "an average value of the pixels in the analysis result of the image analyzer" may play a greater role in determining the reliability, and when "a" is lower than 0.5, "a rate of pixels having a probability which is equal to or higher than a predetermined value" may play a greater role in determining the reliability.

The body part decider 130 may calculate reliabilities of the result values of the first image analyzer 110 and the second image analyzer 120 using Equation 1, as set forth above. According to Equation 1, the reliability may, in theory, range between 0 and 100. Meanwhile, in order to calculate the reliability in the above exemplary embodiment, all of the pixels included in an input image (i.e., a single image) have been used, but it is possible to calculate the reliability using a portion of the pixels of the input image. In addition, it is also possible to calculate the reliability using pixels included in a plurality of consecutively input images. For example, when the user's body is being photographed in real time using a photographing apparatus such as a camera, the reliability for a plurality of input images may be calculated by dividing the plurality of consecutively input images in a predetermined unit of frames (e.g., 10, 20, or 100 frames).

In addition, after calculating reliabilities of the result values of the first image analyzer 110 and the second image analyzer 120, the body part decider 130 may decide a body part for each pixel of the input image based on the calculated reliabilities.

More specifically, the body part decider 130 may compare the calculated reliabilities of the analysis results of the first image analyzer 110 and the second image analyzer 120, and determine a body part for each pixel according to the analysis result having a higher reliability. For example, when the reliability of the analysis result of the second image analyzer 120 is higher than that of the first image analyzer 110, the analysis result of the second image analyzer 120 may be used.

In another exemplary embodiment, when all of the reliabilities of the analysis results of the first image analyzer 110 and the second image analyzer 120 are equal to or higher than a predetermined value, the body part decider 130 may decide a body part for each pixel using an average value of the analysis results of the first image analyzer 110 and the second image analyzer 120.

As described above, the second image analyzer 120 may learn at least a portion of poses, based on a relatively larger amount of data, than the first image analyzer 110, and thus may have a higher recognition rate of at least the portion of poses, than the first image analyzer 110. However, with respect to the remaining poses, the first image analyzer 110 may have a higher recognition rate than the second image analyzer 120. In this case, final result may be output according to the reliability of the analysis result of the second image analyzer 120. When the reliability of the analysis result of the second image analyzer 120 is equal to or high than a predetermined value, the body part decider 130 decides a body part for each pixel according to the analysis result of the second image analyzer 120. When the reliability of the analysis result of the second image analyzer 120 is lower than the predetermined value, the body part decider 130 decides a body part for each pixel according to the analysis result of the first image analyzer 110.

When two or more result values are output for one pixel, the body part decider 130 may decide a body part having the highest probability as a body part of the pixel.

The pose estimator 140 estimates a pose of a human body included in the input image based on the body part for each pixel decided by the body part decider 130. More specifically, when the body part decider 130 decides a body part for each pixel included in the input image, the pose estimator 140 may estimate the pose by connecting the centers of the body parts.

Figure 4:
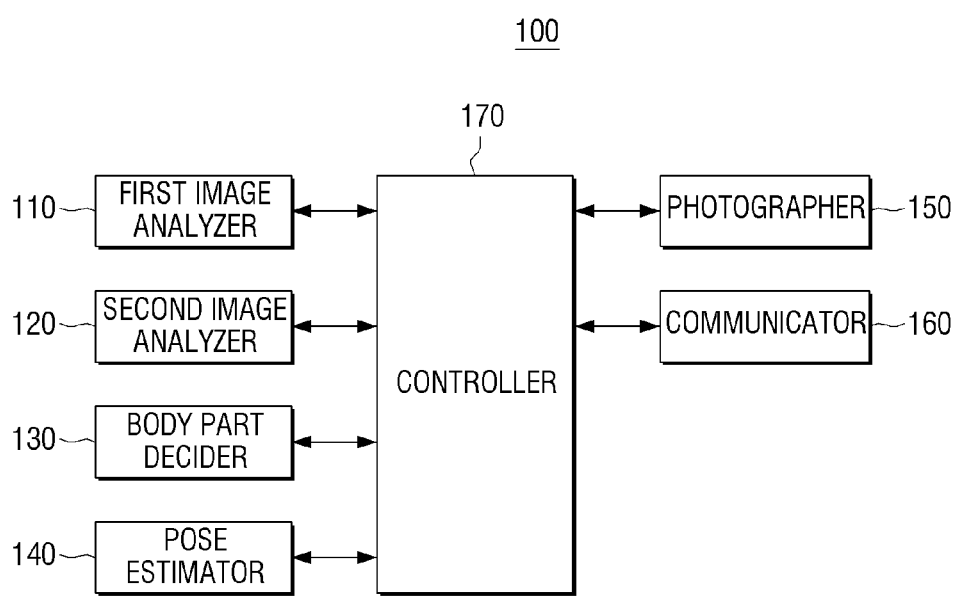
FIG. 4 is a block diagram of a configuration of a pose classification apparatus according to another exemplary embodiment.

FIG. 4 is a block diagram of a configuration of a pose classification apparatus 100 according to another exemplary embodiment. With reference to FIG. 4, the pose classification apparatus 100 may include a photographer 150, a communicator 160, and a controller 170 as well as a first image analyzer 110, a second image analyzer 120, a body part decider 130 and a pose estimator 140.

The photographer 150 photographs an image including a human body. An image photographed by the photographer 150 may be used as an input image of the image analyzers 110 and 120. To do so, the photographer 150 may be implemented with a camera. The photographer 150 may be embedded in the pose classification apparatus 100, or may be provided as an external device which is connected to the pose classification apparatus 100 via cable or wirelessly.

The communicator 160 communicates with an external device. In particular, the communicator 160 may receive an image including a human body from an external device. The communicator 160 may include diverse communication modules such as a local area wireless communication module (not shown) and a wired communication module (not shown). The local area wireless communication module is a module which communicates with an external device in a local area according to a local area wireless communication method such as Bluetooth®, Zigbee®, etc.

The controller 170 controls overall operation of the pose classification apparatus 100. More specifically, the controller 170 may estimate a pose of an input image by controlling the first image analyzer 110, the second image analyzer 120, the body part decider 130, the pose estimator 140, the photographer 150, and the communicator 160.

FIG. 5 is a flow chart which illustrates a pose classification method according to an exemplary embodiment. With reference to FIG. 5, in operation S510, the first image analyzer 110 and the second image analyzer 120 each estimate a body part for each pixel of an input image including a human body. As described above, the second image analyzer 120 has learned at least a portion of poses based on a relatively larger amount of data than the first image analyzer 110, and thus may have a higher recognition rate of at least a portion of the poses.

Subsequently, in operation S520, reliabilities of the estimation results of the first image analyzer 110 and the second image analyzer 120 are calculated. The reliability of the estimation result of each image analyzer may be calculated using an equation below.

Reliability=a*(average value of the pixels for analysis result of the image analyzer)+(1−a)*(rate of pixels having a probability which is equal to or higher than a predetermined value) "an average value of the pixels in the analysis result of the image analyzer" indicates an average value of all of the pixels which are analyzed by the image analyzer. "a rate of pixels having a probability which is equal to or higher than a predetermined value" indicates the rate of pixels having a probability which is equal to or higher than the predetermined value (e.g., 50%) from among all of the pixels analyzed by the image analyzer. In the equation, 0≤a≤1, and "a" is a real number.

In operation S530, a body part of each pixel of the input image is determined based on the calculated reliability. More specifically, the calculated reliabilities of the analysis results of the first image analyzer 110 and the second image analyzer 120 may be compared, and a body part for each pixel may be determined according to the analysis result having higher reliability. In addition, when all of the reliabilities of the analysis results of the first image analyzer 110 and the second image analyzer 120 are equal to or higher than a predetermined value, a body part for each pixel may be determined using an average value of the analysis results of the first image analyzer 110 and the second image analyzer 120. Furthermore, a final result may be output according to the reliability of the analysis result of the second image analyzer 120. More specifically, when the reliability of the analysis result of the second image analyzer 120 is equal to or high than a predetermined value, the body part decider 130 may decide a body part for each pixel according to the analysis result of the second image analyzer 120. When the reliability of the analysis result of the second image analyzer 120 is lower than the predetermined value, the body part decider 130 may decide a body part for each pixel according to the analysis result of the first image analyzer 110.

In operation S540, a pose of a human body included in the input image is estimated based on the decided body part for each pixel. More specifically, when the body part decider 130 decides a body part for each pixel included in the input image, the pose may be estimated by connecting the centers of the body parts.

The pose classification method according to the diverse exemplary embodiments may be implemented with a program executable by a terminal device and may be stored in diverse types of recording media.

More specifically, a code to perform the aforementioned methods may be stored in diverse types of non-transitory recording media, such as flash memory, read-only memory (ROM), erasable programmable ROM (EPROM), electronically erasable and programmable ROM (EEPROM), a hard disk, a removable disk, a memory card, universal serial bus (USB) memory, and compact disk (CD) ROM.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A pose classification apparatus comprising:
   a first image analyzer and a second image analyzer which are configured to estimate a body part for each pixel of an input image including a human body;
   a body part decider configured to calculate reliabilities of analysis results of the first image analyzer and the second image analyzer, and configured to decide the body part for each pixel of the input image based on the calculated reliabilities; and
   a pose estimator configured to estimate a pose of the human body included in the input image based on the decided body part for each pixel,
   wherein the first image analyzer and the second image analyzer each learn based on different data, and
   wherein the second image analyzer is a random forest classifier configured to learn at least a portion of poses based on a relatively larger amount of data than the first image analyzer, and which has a higher recognition rate of at least the portion of poses than the first image analyzer.

2. The pose classification apparatus as claimed in claim 1, wherein in response to all of the reliabilities of the analysis results of the first image analyzer and the second image analyzer being equal to or higher than a predetermined value, the body part decider decides the body part for each pixel according to an average value of the analysis results of the first image analyzer and the second image analyzer.

3. The pose classification apparatus as claimed in claim 1, wherein in response to the calculated reliability of the analysis result of the second image analyzer being equal to or higher than a predetermined value, the body part decider decides the body part for each pixel according to the analysis result of the second image analyzer, and in response to the calculated reliability of the analysis result of the second image analyzer being lower than the predetermined value, the body part decider decides the body part for each pixel according to the analysis result of the first image analyzer.

4. The pose classification apparatus as claimed in claim 1, wherein the first image analyzer and the second image analyzer each include a plurality of body part estimators configured to estimate a probability that each of the pixels of the input image belongs to a particular body part, and
   each of the first image analyzer and the second image analyzer calculates an average value of the estimation results of the plurality of body part estimators, and uses the average value as the analysis result.

5. The pose classification apparatus as claimed in claim 1, wherein the reliability is calculated using the equation:

Reliability=$a$*(an average value of the pixels in the analysis result of the image analyzer)+$(1-a)$*(a rate of pixels having a probability which is equal to or higher than a predetermined value), wherein $0 \leq a \leq 1$, and "a" is a real number.

6. A pose classification apparatus comprising:
   a first image analyzer and a second image analyzer which are configured to estimate a body part for each pixel of an input image including a human body;
   a body part decider configured to calculate reliabilities of analysis results of the first image analyzer and the second image analyzer, and configured to decide the body part for each pixel of the input image based on the calculated reliabilities; and
   a pose estimator configured to estimate a pose of the human body included in the input image based on the decided body part for each pixel,
   wherein the first image analyzer and the second image analyzer each learn based on different data, and
   wherein the body part decider is configured to compare the calculated reliabilities of the analysis results of the first image analyzer and the second image analyzer, and is configured to determine the body part of each pixel according to the analysis result which has higher reliability.

7. A method of classifying a pose, the method comprising:
   estimating a body part for each pixel of an input image including a human body using a first image analyzer and a second image analyzer;
   calculating reliabilities of analysis results of the first image analyzer and the second image analyzer;
   deciding the body part for each pixel of the input image based on the calculated reliabilities; and
   estimating a pose of the human body included in the input image based on the decided body part for each pixel,
   wherein the first image analyzer and the second image analyzer learn based on different data, and
   wherein the second image analyzer is a random forest classifier which learns at least a portion of poses based on a relatively larger amount of data than the first image analyzer and which has a higher recognition rate than the first image analyzer for at least the portion of poses than the first image analyzer.

8. The pose classification method as claimed in claim 7, wherein in the deciding of the body part, in response to all of the reliabilities of the analysis results of the first image analyzer and the second image analyzer being equal to or higher than a predetermined value, the body part for each pixel is decided according to an average value of the analysis results of the first image analyzer and the second image analyzer.

9. The pose classification method as claimed in claim 7, wherein in the deciding of the body part, in response to the calculated reliability of the analysis result of the second image analyzer being equal to or high than a predetermined value, the body part for each pixel is decided according to the analysis result of the second image analyzer, and in response to the calculated reliability of the analysis result of the second image analyzer being lower than the predetermined value, the body part for each pixel is decided according to the analysis result of the first image analyzer.

10. The pose classification method as claimed in claim 7, wherein the estimating of the body part comprises:
    estimating a probability that each of the pixels of the input image belongs to a particular body part, using a plurality of body part estimators of each of the first image analyzer and the second image analyzer; and
    calculating an average value of the estimation results of the plurality of body part estimators of each of the first image analyzer and the second image analyzer.

11. The pose classification method as claimed in claim 7, wherein the reliability is calculated using an equation below;

Reliability=$a$*(an average value of the pixels in the analysis result of the image analyzer)+$(1-a)$*(a rate of pixels having a probability which is equal to or higher than a predetermined value), wherein $0 \leq a \leq 1$, and "a" is a real number.

12. A non-transitory recording medium which records therein a computer program, where the program, when executed by a processor of a computer, causes the computer to execute a pose classification method as recited in claim 7.

13. A method of classifying a pose, the method comprising:
   estimating a body part for each pixel of an input image including a human body using a first image analyzer and a second image analyzer;
   calculating reliabilities of analysis results of the first image analyzer and the second image analyzer;
   deciding the body part for each pixel of the input image based on the calculated reliabilities; and
   estimating a pose of the human body included in the input image based on the decided body part for each pixel,
   wherein the first image analyzer and the second image analyzer learn based on different data, and
   wherein in the deciding of the body part, the calculated reliabilities of the analysis results of the first image analyzer and the second image analyzer are compared, and the body part for each pixel is decided according to the analysis result having higher reliability.

14. A pose classification apparatus comprising:
   first and second image analyzers configured to estimate a body part for each pixel of an input image including a human body;
   a body part decider configured to calculate reliabilities of the analysis results, and configured to decide the body part for each pixel; and
   a pose estimator configured to estimate a pose of the human body based on the decided body part for each pixel,
   wherein each of the image analyzers learn based on different data
   wherein the body part decider decides the body parts based on the calculated reliabilities, and
   wherein in response to the calculated reliability of the analysis result of the second image analyzer being equal to or higher than a predetermined value, the body part decider decides the body part for each pixel according to the analysis result of the second image analyzer.

15. The pose classification apparatus as claimed in claim 14, wherein in response to the calculated reliability of the analysis result of the second image analyzer being lower than the predetermined value, the body part decider decides the body part for each pixel according to the analysis result of the first image analyzer.

* * * * *